United States Patent [19]

Cattani

[11] Patent Number: 4,596,502
[45] Date of Patent: Jun. 24, 1986

[54] DEVICE FOR POSITIONING AND LOCKING TURNING, MILLING OR OTHER TOOL HOLDERS ON TO MOBILE LATHE-MACHINING CENTER SLIDES WITH AN INTERNAL SPINDLE

[75] Inventor: Alberto Cattani, Modena, Italy

[73] Assignee: Comau S.p.A., Grugliasco, Italy

[21] Appl. No.: 457,276

[22] Filed: Jan. 11, 1983

[30] Foreign Application Priority Data

Jul. 29, 1982 [IT] Italy ................ 67959 A/82

[51] Int. Cl.[4] ............................................ B23Q 3/12
[52] U.S. Cl. .................................. 409/231; 409/144; 408/234
[58] Field of Search ............... 409/134, 141, 144, 201, 409/202, 204, 209, 212, 215, 228, 229, 230, 231, 232, 233, 234, 235, 238; 29/26 A, 568; 279/119, 121; 408/234, 238, 239, 240

[56] References Cited

U.S. PATENT DOCUMENTS

| 3,481,614 | 12/1969 | Reich | 279/119 |
| 3,593,614 | 7/1971 | Galbarini et al. | 409/232 |
| 3,925,878 | 12/1975 | Kikuchi | 29/568 |
| 4,419,797 | 12/1983 | Sigloch et al. | 408/35 |

FOREIGN PATENT DOCUMENTS

| 1206038 | 2/1960 | France | 279/119 |
| 16976 | 2/1978 | Japan | 409/233 |
| 2040742 | 9/1980 | United Kingdom | 409/233 |

Primary Examiner—Gil Weidenfeld
Assistant Examiner—Daniel W. Howell
Attorney, Agent, or Firm—Young & Thompson

[57] ABSTRACT

A device for positioning and locking turning, milling or other tool holders onto mobile slides with an internal spindle, comprising a first sytem (14) of conventional type for machining centers which is designed to lock tools (37) usually carried by this type of machine; the device also comprises two diametrically opposing levers external to the slide (10), which are hinged (31) to the slide (10) and each comprises two end teeth (32, 33), of which the first (32) is opposite a projection (29) on the piston (28) of a hydraulic or pneumatic cylinder (23), and the second (33) is arranged to engage in a tool holder (43) of a lathe tool (42) in order to lock it; the locking condition occurs when the piston (28) carrying the projection (29) has moved under the action of spring (27) so as to press against the opposing tooth (32) of the lever (30), so rotating this latter (30) such as to cause its other tooth (33) to engage in the tool holder (43); the release condition occurs when the piston (28) carrying the projection (29) has moved against spring (27), so as to cause the opposing tooth (32) of the lever to abandon the projection (29) such that the lever (30), urged by its spring (35), rotates in order to disengage the second tooth (33) from the tool holder (43).

6 Claims, 3 Drawing Figures

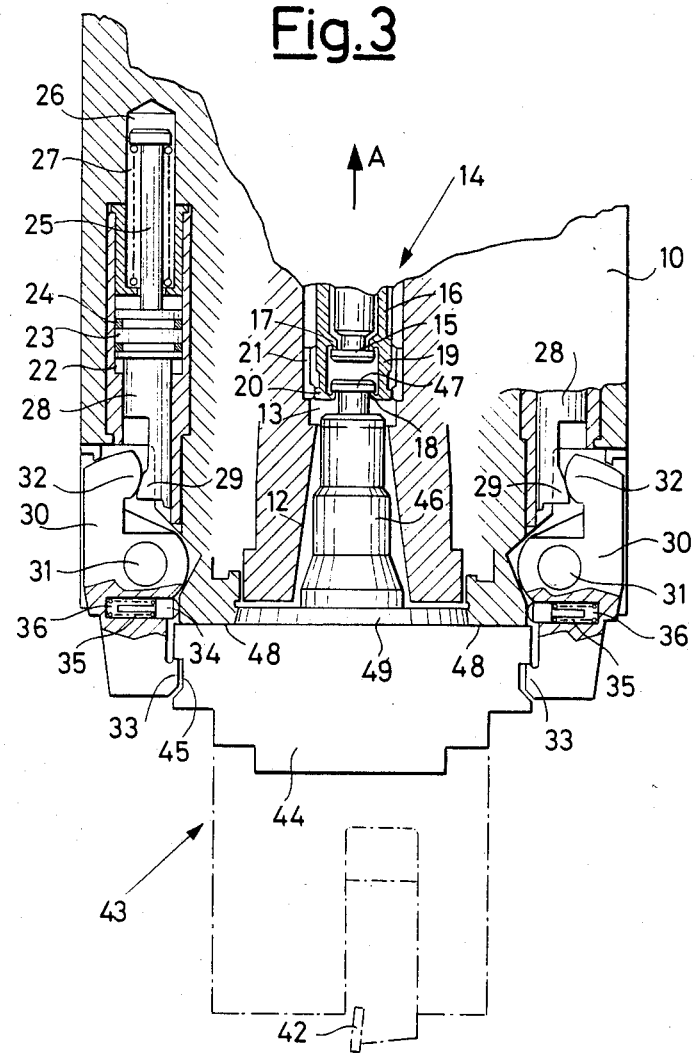

DEVICE FOR POSITIONING AND LOCKING TURNING, MILLING OR OTHER TOOL HOLDERS ON TO MOBILE LATHE-MACHINING CENTER SLIDES WITH AN INTERNAL SPINDLE

The invention relates to a device for positioning and locking turning, milling or other tool holders onto mobile lathe-machining centre slides with an internal spindle.

A lathe-machining centre is a machine tool able to effect a certain number of machining operations on a work piece, these including turning, boring, drilling and various others.

The mobile slide with the internal spindle must obviously be able to carry in a securely clamped manner various types of tool holders, according to the operation which the machine is to carry out on the work piece. The problem therefore arises of how to securely clamp each type of tool holder.

The invention solves this problem by means of a device comprising a double locking system, one of conventional type for machining centres, for use on tools which are not subjected to high torsional and bending stresses (such as a drilling tool), and a supplementary device applicable conjointly with the first if tools are used which are subjected to high stresses (such as a turning tool). A device is thus obtained which is universal overall, i.e. able to provide the optimum type of locking for any type of tool to be clamped to the spindle, this being attained without the use of costly and complicated devices and without prejudice to the overall dimensions of the tool holder slide. This and further objects which will be more apparent hereinafter are attained according to the invention by a device for positioning and locking turning, milling or other tool holders onto mobile slides with an internal spindle, characterised by comprising, coupled to a first system of conventional internal type for locking machining centre tools, a second system for positioning and locking lathe tools, of which the tool holder is positioned in the conical seat of a conventional slide, and is locked by external units carried by the slide.

A description is given hereinafter of the proposed device by way of non-limiting example, with reference to the accompanying drawings in which:

FIGS. 2 and 3 are two different applications of the device of FIG. 1.

Figure 2:
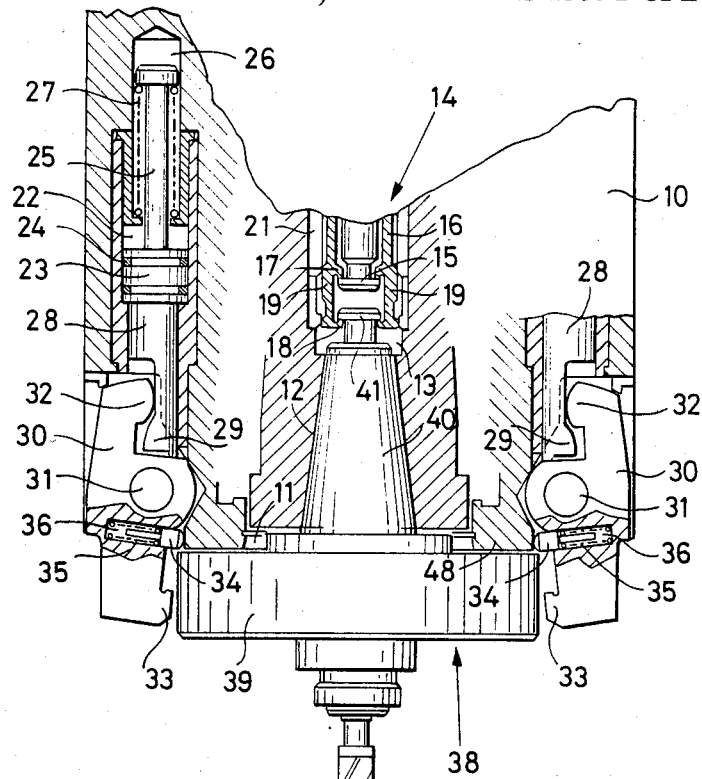

The figures show diagrammatically the essential elements of the end of a slide 10 designed to carry the connection flange of a tool holder in a clamped condition. The slide comprises an axial bore formed with a first short substantially frusto-conical portion 11 connected to a second frusto-conical portion 12 which opens into a cavity 13 carrying the locking control unit 14 of known type for machining centre tools. It consists normally of a rod 15 slidable along the slide axis and inserted between annular grippers or jaws 16 which carry internal projections 17 and 18 directed towards the head 15, whereas externally they comprise a double curvature 19 and 20 which, when the spindle is not operating, mates with a corresponding surface 21 of the inner walls of the cavity 13, between which the grippers or jaws 16 are contained.

To the side of the aforesaid unit there are disposed two or more units which are identical with each other, each of these units being formed as follows. A piston 23 provided with seal gaskets 24 is slidably inserted into a suitable chamber in the slide 10. A rod 25, slidably contained in a chamber 26, and embraced by a spring 27, extends from one face of the piston 23. From the other face of the piston there extends a shank 28 slidably inserted into an appropriate seat and provided at its end with a tooth or projection 29. Beyond the shank 28, a lever 30 is hinged at 31 to the slide 10, and comprises at its two ends respective teeth 32 and 33, of which the first is arranged to cooperate with the projection 29 of the shank 28, and the second is designed to engage with a tool holder, as described hereinafter.

Figure 1:
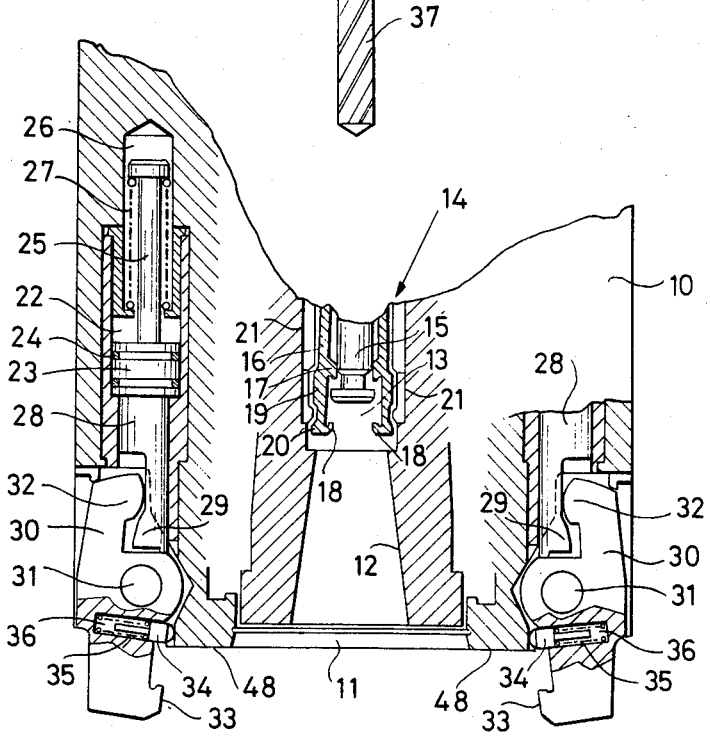
FIG. 1 is an axial section through the end of a tool holder slide provided with the device according to the invention.

The lever 30 also comprises a cavity 36 containing a plunger 34 kept urged against the end of the slide 10 by a spring 35. The purpose of the plunger 34 is only to keep the lever 30 rotated into the position of FIG. 1, i.e. the rest position. FIG. 1 shows the described device in its rest position, i.e. without any tool applied. FIG. 2 shows a drilling or any other machining centre tool applied to the slide. The drilling tool 37 is rigid with a tool holder 38 comprising a cylindrical plate 39 connected to a frusto-conical shank 40 which terminates in a head 41 (standard tool holder configuration for machining centres).

As can be seen from FIG. 2, when fitting the tool holder, the shank 40 is inserted into the bore 12 to mate perfectly therewith, the shank 41 straddling the curved appendices 18 of the arms 16.

FIGS. 1 and 2 show clearly the rest and locking positions of the device 14, and as this is a conventional device for machining centres neither its operation nor its activating members will be described as these are known to every machining centre expert.

If a turning tool is used, the aforesaid type of locking is inadequate in terms of rigidity for the working stresses concerned, so that the tool is locked in this case as shown in FIG. 3, in which the dashed and dotted lines indicate the tool 42 carried by a tool holder 43 comprising a plate 44 provided with a circumferential groove 45 and a shank 46 carrying a head 47.

In contrast to the machining centre tool, the plate 44 abuts against the slide base 48, and the shank 46 is inserted into the bore 12 but without mating with its surface. The end 47 is locked exactly as in the case shown in FIG. 2, by which the tool 42 is clamped axially by means of initial pre-locking. The special configuration of the tool holder, of which the upper base from which the shank 46 extends perfectly mates with the base 48 of the slide and its initial frusto-conical portion 11, results in advantageous pre-centering and centering of the tool holder.

In this respect, on inserting the shank 46 into the bore 12 (FIG. 3), the upper surface of the tool holder 43 firstly grazes the base 48 of the slide, then by virtue of the elasticity of the materials the frusto-conical portion 49 of the tool becomes wedged into the frusto-conical bore 11 of the slide under very slight force, until the tool holder 43 completely abuts against the base 48. This condition ensures that the tool is centered and pre-locked against any lateral oscillation.

Because of the fact that in this case the tool is subjected to high axial and transverse stresses, it is necessary to restrain it in a more rigid manner, similar to that normally done on lathes. This is done by making the piston 23 slide (upwards in FIG. 3) in the same direction as the direction of action of the spring 27. For this purpose, it is necessary only to discharge the oil contained in the chamber 22 for the piston 23 to rise automatically under the action of the spring 27. When the piston 23 rises, the projection 29 also rises and engages with the tooth 32 of the lever 30, to rotate it (as shown in FIG. 3) such that its other tooth 33 engages in the groove 45 of the tool holder 44.

In this manner, axial locking of the tool is attained by the conventional machining centre device 14, together with centering by virtue of the insertion of the tool holder 43 into the slide compartment 11 until it abuts against the slide base 48, and definitive lateral locking by means of the teeth 33 engaging in the grooves 45. On again feeding oil to the chamber 22, the piston 23 descends and its projection 29 abandons the lever tooth 32, the lever then rotating to disengage its second tooth 33 from the groove 45 in the tool holder 44, thus releasing it. On then releasing the shank 46 from its axial locking by the device 14, the tool holder can be withdrawn from the centering seat 11 without difficulty. The figures show two lateral locking devices, for ease of illustration only. The locking devices can in fact be provided in greater number angularly spaced apart, according to the requirements and space availability.

I claim:

1. A device for positioning and locking turning and rotary machining tool holders, comprising an outer member, an inner member disposed within and rotatable relative to said outer member, means for releasably fixedly securing a turning tool holder to said outer member, and means for releasably securing a rotary machining tool holder to said inner member, said inner member having a frusto-conical inner surface of relatively small greatest diameter for releasably retaining a rotary machining tool holder, said outer member having a frusto-conical inner surface of relatively large greatest diameter for releasably retaining a turning tool holder.

2. A device as claimed in claim 1, said means for releasably securing a rotary machining tool holder comprising clamping means disposed within said inner member, said clamping means also comprising a portion of said releasable securing means for said turning tool holder.

3. A device as claimed in claim 1, in which said means for releasably fixedly securing a turning tool holder to said outer member comprise a plurality of releasable clamping means carried by said outer member and spaced apart peripherally about said outer member.

4. A device for positioning and locking turning and rotary machining tool holders, comprising a central clamping device for releasably retaining a rotary machining tool holder, and a plurality of clamping devices spaced symmetrically apart about said central clamping device for releasably fixedly retaining a turning tool holder, said devices for releasably retaining said turning tool holder comprising a plurality of cylinder and piston assemblies that are parallel to each other and that are simultaneously actuable each to actuate one of a plurality of clamping levers for a said turning tool holder.

5. A device for positioning and locking turning and rotary machining tool holders, comprising an outer member, a inner member disposed within and rotatable relative to said outer member, means for releasably fixedly securing a turning tool holder to said outer member, and means for releasably securing a rotary machining tool holder to said inner member, said means for releasably fixedly securing a turning tool holder to said outer member comprising a plurality of releasable clamping means carried by said outer member and spaced apart peripherally about said outer member, said retaining means carried by said outer member each comprising a cylinder and piston assembly parallel to the axis of rotation of said inner member, and a lever individual to each cylinder and piston assembly and actuable by the cylinder and piston assembly releasably to clamp or release a said turning tool holder upon simultaneous actuation of all said cylinder and piston assemblies.

6. A device for positioning and locking turning and rotary machining tool holders, comprising a central clamping device for releasably retaining a rotary machining tool holder, and a plurality of clamping devices spaced symmetrically apart about said central clamping device for releasably fixedly retaining a turning tool holder, and a frusto-conical seat of relatively small greatest internal diameter that coacts with said central clamping device releasably to receive and to retain a said rotary machining tool holder in the device, and a separate frusto-conical seat of relatively large greatest internal diameter which coacts with said plurality of devices releasably to receive and to retain a turning tool holder on the device.

* * * * *